United States Patent
Mittal et al.

(10) Patent No.: US 11,386,031 B2
(45) Date of Patent: Jul. 12, 2022

(54) DISAGGREGATED SWITCH CONTROL PATH WITH DIRECT-ATTACHED DISPATCH

(71) Applicant: XILINX, INC., San Jose, CA (US)

(72) Inventors: Millind Mittal, Saratoga, CA (US); Jaideep Dastidar, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/894,446

(22) Filed: Jun. 5, 2020

(65) Prior Publication Data

US 2021/0382838 A1 Dec. 9, 2021

(51) Int. Cl.
*G06F 13/40* (2006.01)
*G06F 13/42* (2006.01)

(52) U.S. Cl.
CPC ...... *G06F 13/4022* (2013.01); *G06F 13/4221* (2013.01)

(58) Field of Classification Search
USPC .............. 710/14, 15, 31, 33, 38, 51, 62, 316
See application file for complete search history.

(56) References Cited

U.S. PATENT DOCUMENTS

| | | | |
|---|---|---|---|
| 6,608,813 B1 | 8/2003 | Chiussi et al. | |
| 6,914,907 B1 | 7/2005 | Bhardwaj et al. | |
| 7,046,627 B1 * | 5/2006 | Dejanovic | H04L 49/501 370/230 |
| 8,223,650 B2 * | 7/2012 | Kumar | H04L 45/00 370/406 |
| 8,422,493 B2 | 4/2013 | Kono et al. | |
| 8,787,374 B2 | 7/2014 | Maeda et al. | |
| 9,306,845 B2 | 4/2016 | Kumagai et al. | |
| 9,391,835 B2 | 7/2016 | Aoshima et al. | |
| 9,525,591 B2 | 12/2016 | Yasuda et al. | |
| 9,794,194 B2 | 10/2017 | Yasuda et al. | |
| 10,097,466 B2 | 10/2018 | Tang et al. | |
| 10,409,743 B1 | 9/2019 | Mittal et al. | |
| 2004/0039986 A1 | 2/2004 | Solomon et al. | |
| 2005/0005084 A1 * | 1/2005 | Burger | G06F 9/4494 712/10 |
| 2009/0083471 A1 | 3/2009 | Frey et al. | |

(Continued)

*Primary Examiner* — Idriss N Alrobaye
*Assistant Examiner* — Henry W Yu
(74) *Attorney, Agent, or Firm* — Patterson + Sheridan, LLP

(57) ABSTRACT

Embodiments herein describe techniques for separating data transmitted between I/O functions in an integrated component and a host into separate data paths. In one embodiment, data packets are transmitted using a direct data path that bypasses a switch in the integrated component. In contrast, configuration packets (e.g., hot-swap, hot-add, hot-remove data, some types of descriptors, etc.) are transmitted to the switch which then forwards the configuration packets to their destination. The direct path for the data packets does not rely on switch connectivity (and its accompanying latency) to transport bandwidth sensitive traffic between the host and the I/O functions, and instead avoids (e.g., bypasses) the bandwidth, resource, store/forward, and latency properties of the switch. Meanwhile, the software compatibility attributes, such as hot plug attributes (which are not latency or bandwidth sensitive), continue to be supported by using the switch to provide a configuration data path.

19 Claims, 7 Drawing Sheets

(56) References Cited

U.S. PATENT DOCUMENTS

| | | | |
|---|---|---|---|
| 2011/0063976 A1* | 3/2011 | Birk | H04L 43/16 |
| | | | 370/235 |
| 2014/0372660 A1* | 12/2014 | Jones | G06F 13/4022 |
| | | | 710/316 |
| 2017/0075838 A1* | 3/2017 | Nooney | H04L 49/1515 |
| 2018/0287964 A1* | 10/2018 | Gray | H04L 49/109 |

* cited by examiner

DISAGGREGATED SWITCH CONTROL PATH WITH DIRECT-ATTACHED DISPATCH

TECHNICAL FIELD

Examples of the present disclosure generally relate to establishing separate data paths for data packets and configuration packets transmitted between a host and I/O functions on an integrated component.

BACKGROUND

Server Host-Accelerator systems, such as those enabled by Peripheral Component Interconnect Express (PCIe) or cache coherency protocols such as Compute Express Link (CXL) and Cache Coherent Interconnect for Accelerators (CCIX) achieve increased fan out to multiple devices via protocol aware switch components. Thus, a single physical host port can communicate to multiple I/O devices such as field programmable gate array (FPGA), graphics processing unit (GPU), network interface card (NIC), including devices performing different I/O functions such as a network functions, storage functions, accelerator functions, Direct Memory Access (DMA) functions, etc. even though both the host and the I/O devices are communicating through point-to-point connections established by CXL, CCIX, and PCIe.

Server Host-Accelerator systems also provide for hot-plug mechanisms, via the same protocol aware switch components, for the multi-device card slots in the system. These hot-plug mechanisms, including hot-add and hot-remove capability, create systems where a particular server is not constrained to a fixed combination of functions based on statically plugged in protocol cards in those slots. Instead, any combination of the I/O functions can be hot-added, hot-removed, or hot-swapped dynamically at runtime to create the desired composition of the system.

However, PCIe and CXL topologies are tree topologies. The disadvantage of tree topologies is that traffic from the host must traverse from a source root node via an upstream port of the switch to a branch of the tree. Traffic in the opposite direction is subject to the same tree traversal path. Further, cache coherency protocols have a heightened sensitivity to latency due to the disproportionate impact of latency to overall system performance. For the case of caching agents, prior techniques result in increased latency in servicing coherency actions to multiple cache-agent endpoints connected through the switch bottleneck. In addition to coherency protocols, prior techniques result in increased latency between the host and each device due to having to arbitrate for resources in, and transport through, the switch when transmitting data between the host and an I/O device. Further, there is reduced bandwidth between the host and each I/O device due to sharing of bandwidth through the switch for concurrent protocol messages between the host and all devices. Finally, there is reduced efficiency of resources in the switch due to the switch having to store and then forward requests and responses between all the I/O devices to the singular upstream connection to the host.

SUMMARY

One embodiment described herein is a computing system that includes a host comprising a first port and an integrated component that includes a second port where the first and second ports form a physical connection between the host and the integrated component, a plurality of I/O functions, and a pass through interface configured to receive a packet from the host via the second port, identify a type of the packet, and route the packet one of: directly to a destination I/O function of the plurality of I/O functions or indirectly to the destination I/O function using the embedded switch based on the type of the packet.

One embodiment described herein is an apparatus that includes a first port configured to form a physical connection with a second port on a host, a plurality of I/O functions, an embedded switch, and a pass through interface configured to receive a packet from the host via the first port, identify a type of the packet, and route the packet one of: directly to a destination I/O function of the plurality of I/O functions or indirectly to the destination I/O function using the embedded switch based on the type of the packet.

One embodiment described herein is a method that includes receiving a first packet from a host at a pass through interface in an integrated component where the integrated component comprises a plurality of I/O functions and an embedded switch communicatively coupled to the pass through interface, determining that the first packet is a data packet where a first I/O function of the plurality of I/O functions is a destination of the data packet, routing the data packet directly from the pass through interface to the first I/O function using a direct data path that bypasses the embedded switch, receiving a second packet from the host at the pass through interface, determining that the second packet is a configuration packet where the first I/O function is the destination of the configuration packet, and routing the data packet from the pass through interface to the first I/O function via the embedded switch.

BRIEF DESCRIPTION OF DRAWINGS

So that the manner in which the above recited features can be understood in detail, amore particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
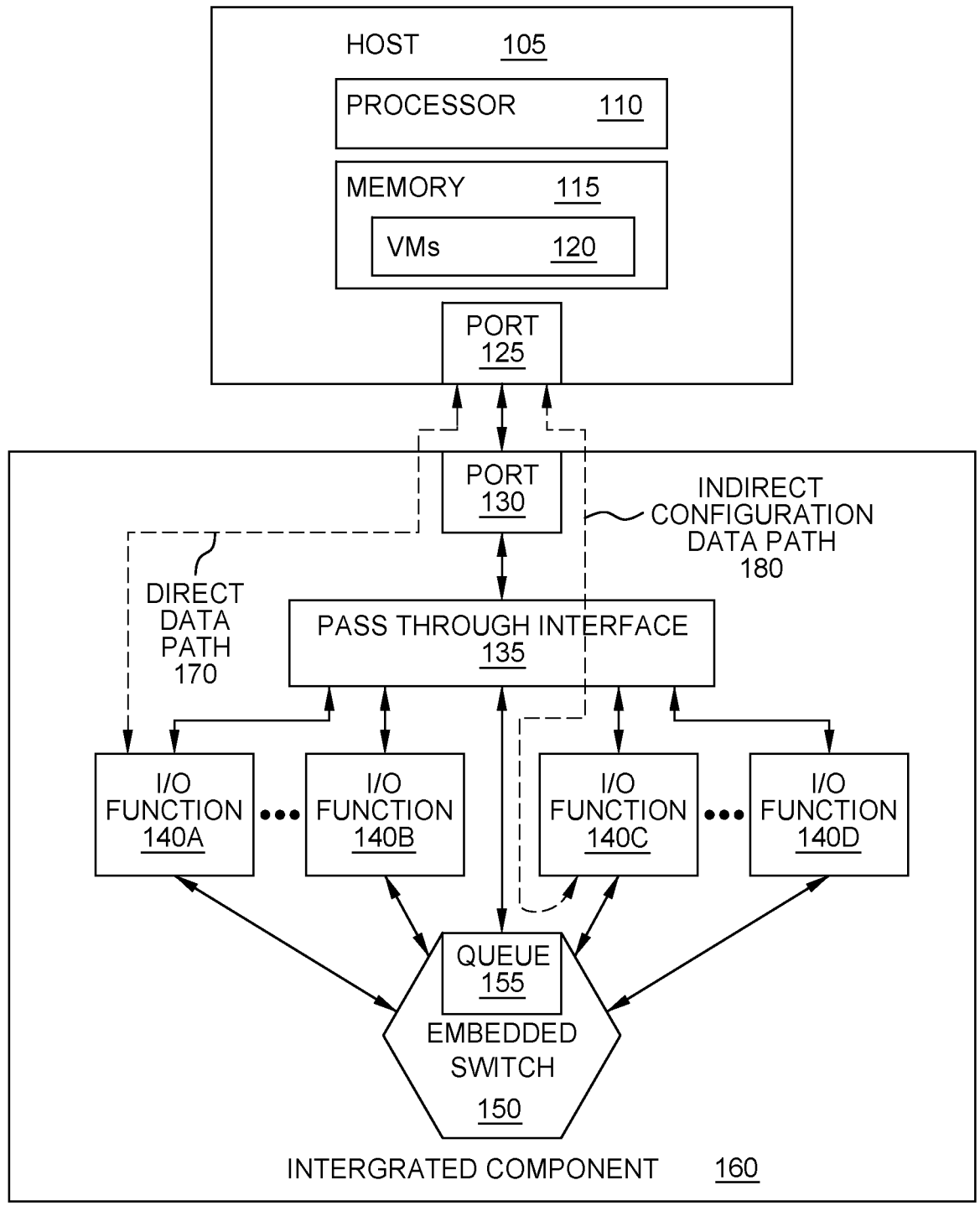
FIG. 1 illustrates a computing system with different data paths for I/O functions, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe techniques for separating data transmitted between I/O functions in an integrated component and a host into separate data paths. In one embodiment, data packets (e.g., DMA payloads and descriptors, CXL snoops, or CCIX message) are transmitted using a direct data path that bypasses a switch in the integrated component. In contrast, configuration packets (e.g., hot-swap, hot-add, hot-remove data, configuration control writes or configuration status reads, etc.) are transmitted to the switch which then forwards the configuration packets to their destination. In this manner, the switch control path is disaggregated into two paths: one for data packets and another for configuration packets. The direct path for the data packets does not rely on switch connectivity to transport bandwidth or latency sensitive traffic between the host and the I/O functions, and instead avoids (e.g., bypasses) the bandwidth, resource, store/forward, and latency properties of the switch. Meanwhile, the software compatibility attributes, such as hot plug attributes or programming of configuration registers (which are not latency or bandwidth sensitive), continue to be supported by using the switch to provide a configuration data path.

In one embodiment, the integrated component includes a pass through interface for routing data received from the host to the I/O functions and the switch, as well as arbitrating between the I/O functions and the switch when transmitting data to the host. However, unlike the switch which buffers data in a queue (thereby adding latency and impacting bandwidth), the routing and arbitration functions of the pass through interface do not store packets but rather immediately forward received packets to their destination. As described above, the pass through interface can establish direct paths between the host and the I/O functions that bypass the switch for time sensitive data while configuration data (which is not latency or time sensitive) is routed between the host and I/O functions using the switch. In this manner, the packets that are not latency or bandwidth sensitive do not clog up the same data path that is used by the latency and bandwidth sensitive data.

FIG. 1 illustrates a computing system 100 with different data paths for I/O functions 140, according to an example. Specifically, the computing system 100 provides a direct data path 170 for transmitting data packets between a host 105 and the I/O functions 140 and an indirect configuration data path 180 for transmitting configuration packets between the host 105 and the I/O functions 140. Thus, unlike previous solutions where the time sensitive data and the non-time sensitive data share the same physical connections, in the computing system 100 the time sensitive data can be transmitted on a separate path from the non-time sensitive data in an integrated component 160.

As shown, the computing system 100 includes the host 105 and the integrated component 160 that contains the I/O functions 140. In this example, the host 105 includes one or more processors 110 and memory 115. The processors 110 represent any number of processing elements which each can contain any number of processing cores. The memory 115 can include volatile memory elements, non-volatile memory elements, or a combination of both. In this example, the memory 115 hosts one or more virtual machines (VMs) 120 or tenants. These VMs 120 may perform functions that submit tasks to the integrated component 160. The I/O functions 140 in the integrated component 160 can then perform those tasks.

The host 105 includes a port 125 that is coupled to a port 130 in the integrated component 160. That is, the host 105 and the I/O functions 140 in the integrated component 160 use the same pair of ports 125, 130 to exchange data. In one embodiment, the host 105 and the integrated component 160 use the PCIe protocol to exchange data on the ports 125, 130. Further, the same physical connection between the ports 125, 130 is shared by the I/O functions 140 in the integrated component 160. In one embodiment, only one of the I/O functions 140 can use the physical connection between the ports 125, 130 at any given time. Time multiplexing can be used such that each of the I/O functions 140 has an opportunity to use the physical connection to exchange data with the host 105. In this manner, the bandwidth of the physical connection between the ports 125, 130 (which typically is the largest bandwidth connection) is shared between the I/O functions 140.

The integrated component 160 can be any physical device where multiple I/O functions 140 and the embedded switch 150 can be integrated. In one embodiment, the integrated component 160 can include a printed circuit board (PCB) (e.g., a substrate) where the I/O functions 140 and the embedded switch 150 are separate integrated circuits (e.g., semiconductor chips) that are mounted onto the PCB. The PCB can include sockets where these integrated circuits plug into the PCB. That way, the integrated circuits can be hot-swapped (e.g., one integrated circuit that performs a first I/O function is removed from a socket and replaced by a second integrated circuit that performs a second I/O function). In another embodiment, the integrated component 160 can be a system in a package (SiP) where the integrated circuits for the I/O functions 140 and the embedded switch 150 are enclosed in one or more chip carrier packages. Although the I/O functions might not be able to be hot-swapped when in a SiP, the I/O functions 140 can still be selectively activated and deactivated (e.g., hot-added and hot-removed).

In yet another embodiment, the integrated component 160 is a system on a chip (SoC) where all the components in the component 160 are included in the same integrated circuit or chip. The SoC can include hardened logic for implementing the I/O functions 140 where the functions 140 can be activated or deactivated (e.g., hot added or hot removed). Alternatively, the SoC can include programmable logic for implementing the I/O functions 140 so that the I/O functions 140 can be hot swapped, where the programmable logic for one I/O function is reconfigured so that the programmable logic performs a second I/O function. In other embodiments, the integrated component 160 can be a FPGA where the circuitry illustrated in the integrated component 160 is implemented in programmable logic or an ASIC where the circuitry is implemented using hardened logic.

Regardless of the specific implementation of the integrated component 160, the I/O functions 140 can be activated or deactivated while the computing system 100 is operating (e.g., hot-added or hot-removed) by physically removing integrated circuits, deactivated/activating hardened logic, or reprogramming programmable logic. In some embodiments, the I/O functions 140 can be hot swapped by replacing a first integrated circuit with another integrated circuit on a substrate (e.g., a PCB) or reconfiguring programmable logic that previously performed a first I/O function to perform a second I/O function. Other I/O functions 140 in the integrated component 160 that are not affected by the hot swap/add/remove can continue to operate in parallel.

The integrated component 160 includes a pass through interface 135 that is coupled to the port 130, the I/O functions 140, and the embedded switch 150. The pass through interface 135 performs routing and arbitration functions for transmitting packets between the I/O functions 140, the switch 150 and the host 105 using the port 130. For example, when receiving a packet from the host 105, the pass through interface 135 determines the type of the packet that indicates whether the packet should traverse one of the direct data paths 170 to an I/O function 140 or instead should be routed to the embedded switch 150. When transmitting a packet from the integrated component 160 to the host 105, the pass through interface 135 can use arbitration logic to decide which source (e.g., one of the I/O functions 140 or the embedded switch 150) can use the port 130 to transmit packets to the host 105.

In one embodiment, the pass through interface 135 does not buffer or queue packets it receives from the host 105, the I/O functions 140, or the switch 150. Instead, the interface 135 permits packets to "pass through" without adding latency. For example, when the pass through interface 135 receives a packet, it immediately forwards the packet to a destination so that received packets do not have to wait for previously received packets to be forwarded by the pass through interface 135. The pass through interface 135 is discussed in more detail in FIG. 2.

The I/O functions 140 can be any function which might be offloaded by the host 105 to be performed by the integrated component 160. For example, the I/O functions 140 can be accelerators (e.g., graphics accelerator, artificial intelligence of machine learning accelerator, cryptographic accelerator, compression accelerator, etc.). In other examples, The I/O functions 140 may be a network communication function (e.g., a NIC function), a DMA engine, network storage function, and the like.

The I/O functions 140 can be considered as separate I/O devices or functions that can operate independently of each other. For example, the I/O function 140A can be a DMA engine that performs network storage while the I/O function 140B is an artificial intelligence accelerator. The I/O functions 140A and 140B can be separate integrated circuits, or can be different circuitry in the same integrated circuit (e.g., different hardened logic or different programmable logic). In any case, as discussed below, the I/O functions 140 can be hot-removed (deactivated) or hot-added (activated) while the computing system 100 is operating. For example, the host 105 can currently be communicating with the I/O function 140A at the same time the integrated component 160 adds a new I/O function 140 (e.g., activating I/O function 140B which was previously deactivated, or adding a fifth I/O function (not shown)) or removes an I/O function (e.g., deactivating I/O function 140C which was previously activated).

The embedded switch 150 can be a PCIe switch that routes packets between the I/O functions 140 and the host 105. Also, the switch 150 can receive packets from the host 105, which are not forwarded to the I/O functions 140. As mentioned above, the switch 150 may be used to route non-latency and non-bandwidth sensitive data such as configuration packets that are used to hot-swap, hot-add, or hot-remove the I/O functions 140. The configuration packets can also include other information such as descriptors used in cache coherency protocols to start send and receive actions.

In FIG. 1, configuration packets transmitted by the host 105 which are intended for one of the I/O functions 140 are routed through the switch 150 along one of the indirect configuration data paths 180. As a result, the configuration packets are stored in a queue 155 in the switch 150. This queue 155 can also be referred to as a host-switch buffer. The switch 150 can perform an arbitration function to determine when configuration packets stored in the queue 155 are transmitted or processed.

Notably, in FIG. 1, the direct data paths 170 bypass the embedded switch 150, and more specifically, the queue 155. As such, the direct data path 170 can also be referred to as a bypass path which avoids the latency introduced by the queue 155. Thus, the computing system 100 reduces the latency relative to prior techniques where all data went through the switch 150 when servicing coherency actions for multiple cache-agent endpoints (i.e., the I/O functions 140). Further, the embodiments herein avoid having to arbitrate for resources in the switch when transmitting latency and bandwidth sensitive data between the host 105 and the I/O functions 140. That is, the sensitive data can use the direct data paths 170 to avoid the arbitration function performed by the switch 150 (although arbitration is still performed at the pass through interface 135 as described below but the pass through interface 135 does not use a queue).

Also, the host 105 and each I/O functions 140 do not have to share bandwidth through the switch for concurrent protocol messages between the host 105 and all I/O functions 140 since these messages can use the direct data paths 170. Further, the computing system 100 avoids relying on the switch 150 to store and then forward requests and responses between all the I/O functions 140 to the singular upstream connection to the host 105 formed by the ports 125 and 130. Thus, the computing system 100 can benefit from improved performance where multiple endpoints (e.g., I/O functions 140) are connected in a fan out to the host 105 using a single connection (e.g., the physical connection between the ports 125, 130) relative to prior techniques where all traffic is routed through the switch 150.

Figure 2:
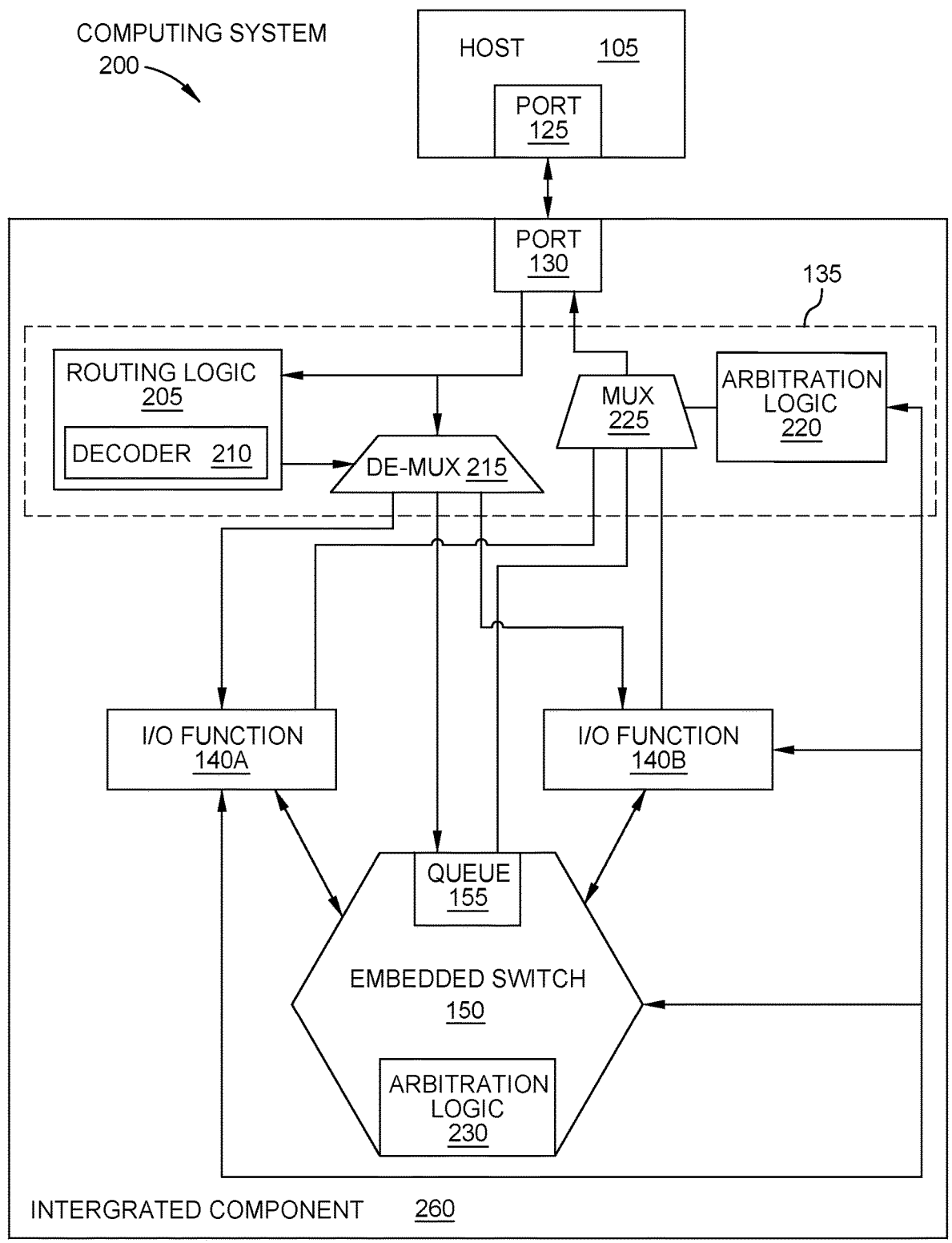
FIG. 2 illustrates a pass through interface with different data paths, according to an example.

FIG. 2 illustrates a pass through interface 135 with different data paths, according to an example. That is, FIG. 2 illustrates one example of circuitry in a pass through interface 135 which permits a computing system 200 to have the direct data paths and the Indirect configuration data paths illustrated in FIG. 1.

For simplicity, the integrated component 260 in FIG. 2 contains just two I/O functions 140A and 140B but can include any number of I/O functions or I/O devices. To route data from the host 105 to the I/O functions 140 or the embedded switch 150, the pass through interface 135 includes routing logic 205 and a demultiplexer (de-mux) 215. In general, the routing logic 205 determines the destination of a packet received from the port 125 of the host 105 (referred to as downstream traffic). Based on the destination, the routing logic 205 controls the select line of the de-mux 215 so that the packet is routed to the correct destination—i.e., one of the I/O functions 140 or the embedded switch 150.

In this example, the routing logic 205 includes a decoder 210 that decodes data contained in the packet received from the host 105 to determine the packet's destination. In one embodiment, the decoder 210 identifies a type of a packet as well as a destination ID of the packet. The type of the packet determines whether the packet should traverse a direct data path to one of the I/O functions 140 or traverse the indirect configuration data path to the embedded switch 150. That is, data packets may be sent directly to the I/O functions 140 while configuration packets are transmitted to the embedded switch 150. If the decoder 210 determines the packet is a data packet, the decoder 210 can also determine which of the I/O functions 140 is its destination. When adding an I/O function 140 to the integrated component 260, the host 105 may assign an ID to the I/O function 140 which the host 105 provides to the decoder 210. By embedding this ID in the data packets transmitted by the host 105, the decoder 210 can identify the correct destination of the data packet so the routing logic 205 routes the data packet on the direct data path corresponding to the selected I/O function 140.

To forward upstream traffic from the integrated component 260 to the host 105, the pass through interface 135 includes arbitration logic 220 that determines which circuit component in the integrated component 260 can use the port 130. As shown, a mux 225 connects each of the I/O functions 140 and the embedded switch 150 to the port 130. The selection signal for the mux 225 is provided by the arbitration logic 220. In one embodiment, the arbitration logic 220 determines which of these circuit components can transmit packets to the port 130 (e.g., the arbitration logic 220 time controls the select line of the mux 225). In this example, the arbitration logic 220 permits only one of the I/O functions 140 or the embedded switch 150 access to the port 130 so there is not a data collision. The details of arbitration logic 220 are discussed in more detail below.

As FIG. 2 illustrates, regardless whether the integrated component 260 receives downstream data from the host 105 or transmits upstream data to the host 105, the data is permitted to pass through the interface 135 without being queued. As a result, traffic transmitted along the direct data paths between the I/O functions 140 and the host 105 have reduced latency relative to systems where the I/O functions 140 rely on the embedded switch 150 as an intermediary between them and the host 105.

Like the pass through interface 135, the embedded switch 150 also includes arbitration logic 230. That is, because the queue 155 can store multiple packets from multiple sources (e.g., packets received from the I/O functions 140 or packets generated by internal circuitry in the switch 150), the arbitration logic 230 can decide which of these packets should take priority in the queue 155 (rather than a simple first in-first out model). For example, both the arbitration logic 220 and the arbitration logic 230 may prioritize traffic generated by the I/O functions above the traffic generated by internal circuitry in the switch, or prioritize traffic received from the I/O function 140A above traffic received from the I/O function 140B. This is discussed in more detail below.

Figure 3:
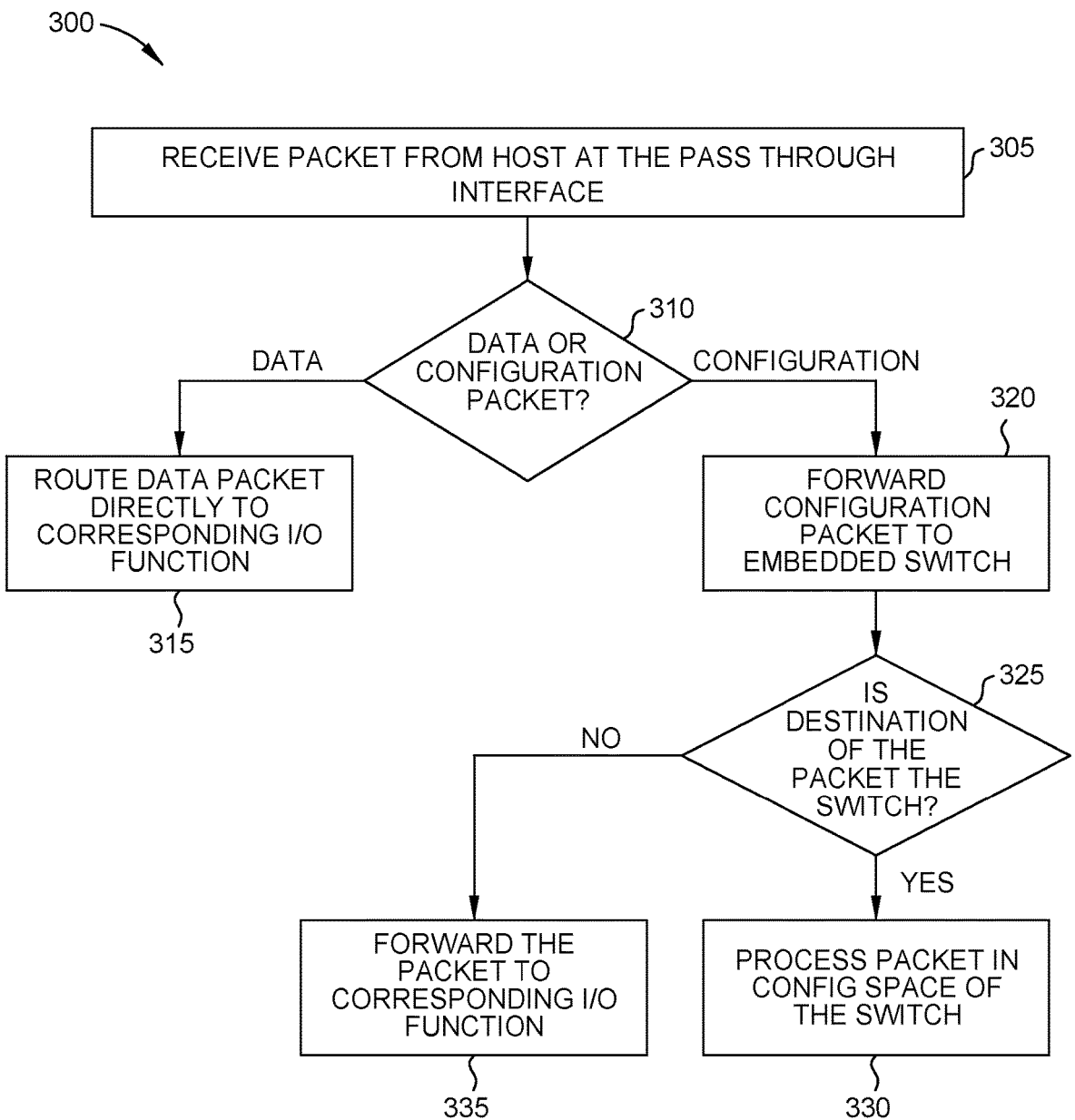
FIG. 3 is a flowchart for transmitting data and configuration packets from a host to I/O functions using different data paths, according to an example.

FIG. 3 is a flowchart of a method 300 for transmitting data and configuration packets from a host to I/O functions using different data paths, according to an example. At block 305, the integrated component receives a packet from the host at the pass through interface. In one embodiment, the integrated component comprises multiple I/O functions (or I/O devices) that rely on a shared physical connection between the integrated component and the host.

At block 310, a decoder in the pass through interface determines whether the received packet is a data packet or a configuration packet. For example, a packet header may contain data that indicates the type of packet. This information may be put in the packet by the host or may be part of the physical transport protocol used to transmit the packet (e.g., PCIe). In any case, the decoder can decode the information in the packet to determine whether it is data packet, or more generally, a packet that has time sensitive data, or a configuration packet, e.g., a packet that has non-time sensitive data.

The distinction between the data packets and the configuration packet can vary depending on the particular implementation of the computing system. For example, the data packets may be DMA payload, CXL snoops, CCIX messages and the like, while the configuration packets include descriptors or commands for performing hot-swapping, hot-adding, or hot-removing (e.g., host-to-I/O device control messages). The embodiments herein can be used with any system where data can be bifurcated according to a packet type.

If the packet is a data packet, the method 300 proceeds to block 315 where the pass through interface routes the data packet directly to the corresponding I/O function. Stated differently, routing logic in the pass through interface forwards the data packet on a direct data path that bypasses the embedded switch in the integrated component. In one embodiment, the decoder in the routing logic decodes the received data packet to identify a destination of the packet (e.g., identifies a destination ID in the data packet). For example, when configuring the computing system (e.g., when adding the I/O functions or establishing communication between the I/O functions and the host), the host can assign destination IDs to the I/O functions which are known to the routing logic. When transmitting packets to the integrated component, the host can embed the destination IDs in the packets. The decoder can then identify those IDs and the routing logic can ensure the received packet is forwarded to the appropriate I/O function, e.g., using the de-mux.

However, if the packet is a configuration packet, the method 300 instead proceeds to block 320 where the pass through interface forwards the configuration packet to the embedded switch. At block 325, the embedded switch determines whether the destination of the configuration packet is the switch itself, or one of the I/O functions. That is, in method 300, the host can transmit configuration packets that are destined for the switch, which may configure the switch to perform a specific task. The host may send configuration packets also to the I/O functions.

If the configuration packet is destined to the switch, the method 300 proceeds to block 330 where the embedded switch processes the packet in a configuration (config) space of the switch (not shown in FIG. 2). The configuration packet may change the operation of the configuration of the switch by altering the config space.

If the configuration packet is destined to one of the I/O functions, the method 300 instead proceeds to block 335 where the embedded switch forwards the packet to the corresponding I/O function. That is, the switch identifies which I/O function is the destination of the configuration packet and forwards the packet to that I/O function using the indirect configuration data path.

Figure 4:
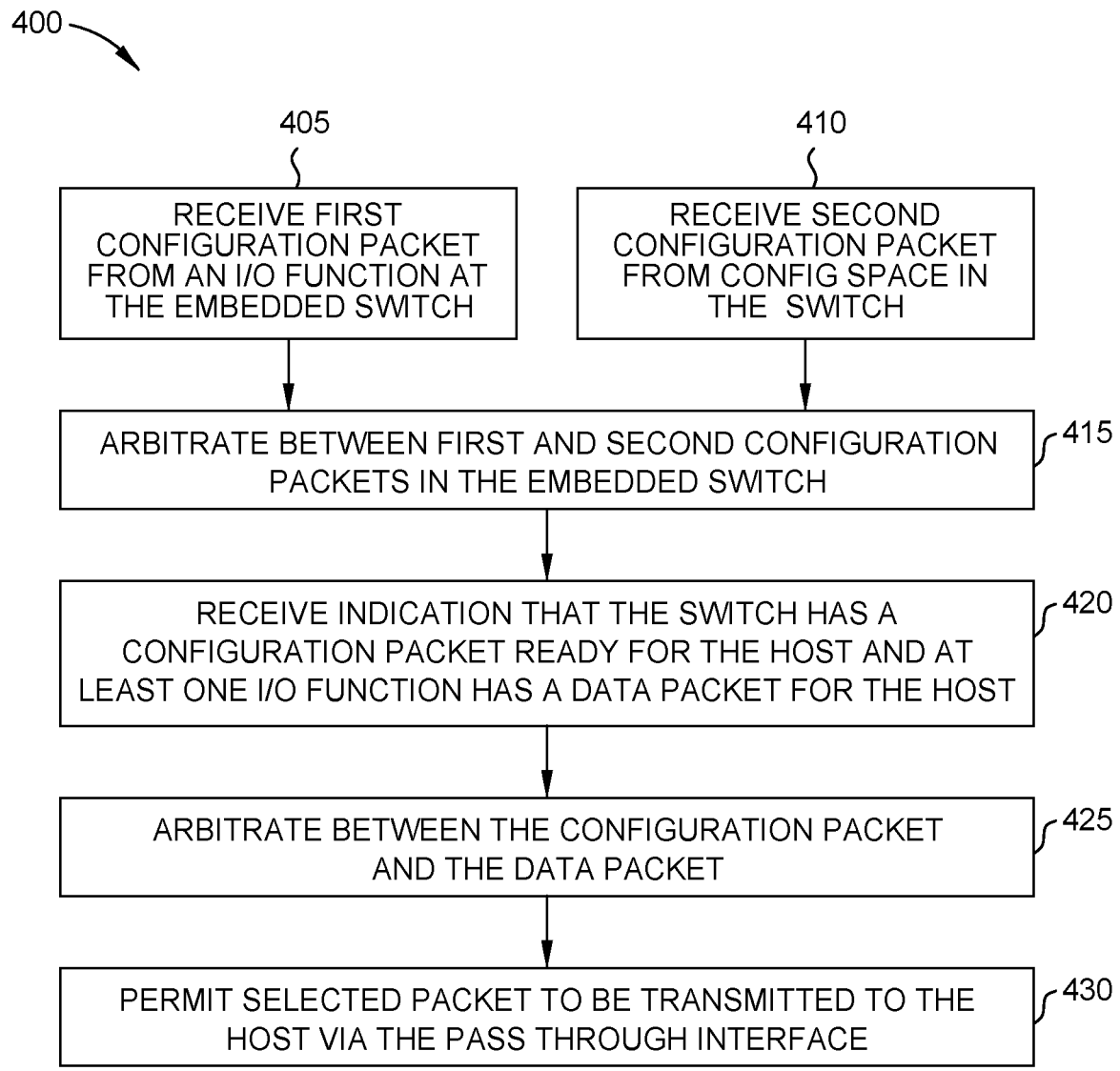
FIG. 4 is a flowchart for transmitting data and configuration packets from I/O functions to a host using different data paths, according to an example.

FIG. 4 is a flowchart of a method 400 for transmitting data and configuration packets from I/O functions to a host using different data paths, according to an example. That is, while the method 300 described techniques for transmitting data from the host to the various circuit components in the integrated component using two data paths, the method 400 describes transmitting data from the integrated component to the host using the two data paths.

At block 405, the embedded switch receives a first configuration packet (e.g., a configuration response message) from one of the I/O functions. For example, the first configuration packet may be a reply to a configuration packet previously transmitted by the host to the I/O function.

In parallel, or substantially at the same time, at block 410 the embedded switch receives a second configuration packet from the config space in the switch. Or in another embodiment, the embedded switch may receive two (or more) configuration packets from two of the I/O functions at substantially the same time.

At block 415, the arbitration logic in the embedded switch arbitrates between the first and second configuration packets in the embedded switch. That is, the first and second packets may be stored in the queue, waiting for arbitration to complete before the packets can be transmitted to the pass through interface, and then to the host. This arbitration logic can be based on a quality of service (QoS) policy that may favor the I/O functions over config space in the switch, or favor one of the I/O functions above one or more of the other I/O functions.

When the arbitration logic in the switch determines which of the first and second packets to send first, the switch may still wait before transmitting the packet to the pass through interface. As shown in FIG. 2, the pass through interface 135 has its own arbitration logic 220 which determines which circuit (e.g., the switch or one of the I/O functions) is permitted to transmit data to the host using, e.g., the mux 225.

At block 420, the arbitration logic in the pass through interface (e.g., arbitration logic 220) receives an indication that the switch has a configuration packet ready for the host (e.g., the first and second configuration packets) and at least one I/O function has a data packet for the host. That is, the method 400 assumes that at least two devices in the integrated component (e.g., the switch and one of the I/O functions or multiple ones of the I/O functions) have data ready to be sent to the host. If only one component currently wants to transmit data to the host, then the arbitration logic can simply permit that component to the use the physical connection (e.g., the physical connection between the host and the integrated circuit) without any arbitration.

However, assuming multiple components want to transmit data to the host, at block 425 the arbitration logic in the pass through interface arbitrates between the configuration packet and the data packet. In one embodiment, the arbitration logic can use a QoS policy that prioritizes the data packets over configuration packets. Or stated differently, the QoS policy can favor packets being transmitted directly from the I/O functions over packets being transmitted by the switch. In another example, the QoS policy may prioritize the I/O functions over each other. For example, the VMs (or tenants) in the host may have different priorities. The I/O function (or functions) in the integrated component used by the higher priority VMs in the host may be given higher priority in the QoS policy used by the arbitration logic in the pass through interface than an I/O function used by a lesser priority VM in the host.

At block 430, the arbitration logic in the pass through interface permits the selected packet (decided by arbitration) to be transmitted to the host In one embodiment, the arbitration logic has weighted arbitration and informs one of the I/O functions or the switch that it can access the shared bus for a specific time (or to send a specific amount or number of data). In this manner, the arbitration logic can control which component in the integrated component can use the shared physical connection between the integrated component and the host.

Figure 5:
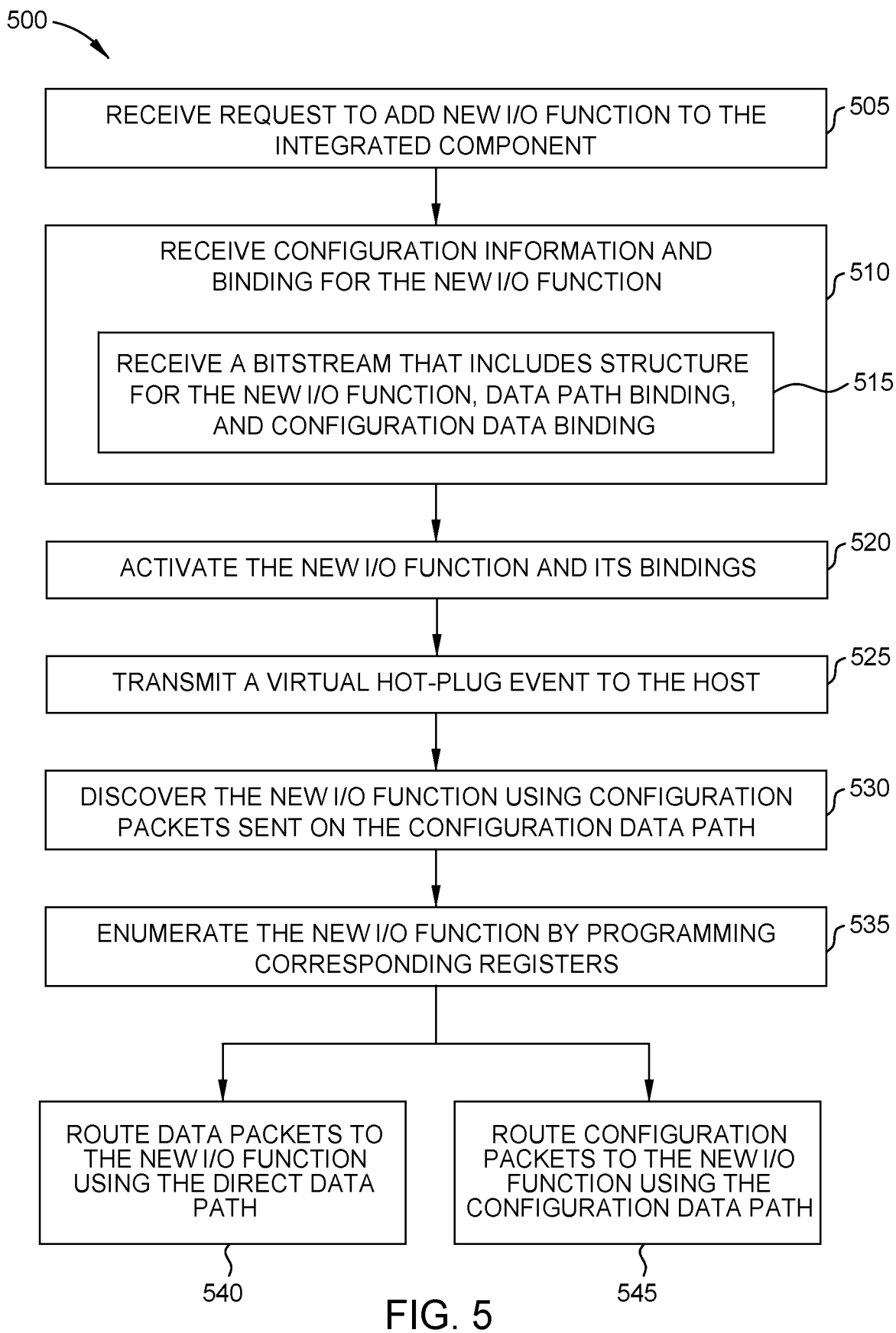
FIG. 5 is a flowchart for hot swapping a new I/O function, according to examples.

FIG. 5 is a flowchart of a method 500 for hot swapping a new I/O function, according to examples. For ease of explanation, the method 500 is discussed in tandem with FIG. 6 that illustrates a computing system where a new I/O function is added, according to examples.

At block 505, the integrated component receives a request from the host to add a new I/O function. In one embodiment, a software driver for the integrated component (which is executed in the host) determines to hot-add a new I/O function to the integrated component. For example, a VM or tenant executing on the host may have sent a request for a new I/O function, or a hypervisor determines the VM or tenant requires a new I/O function.

Figure 6:
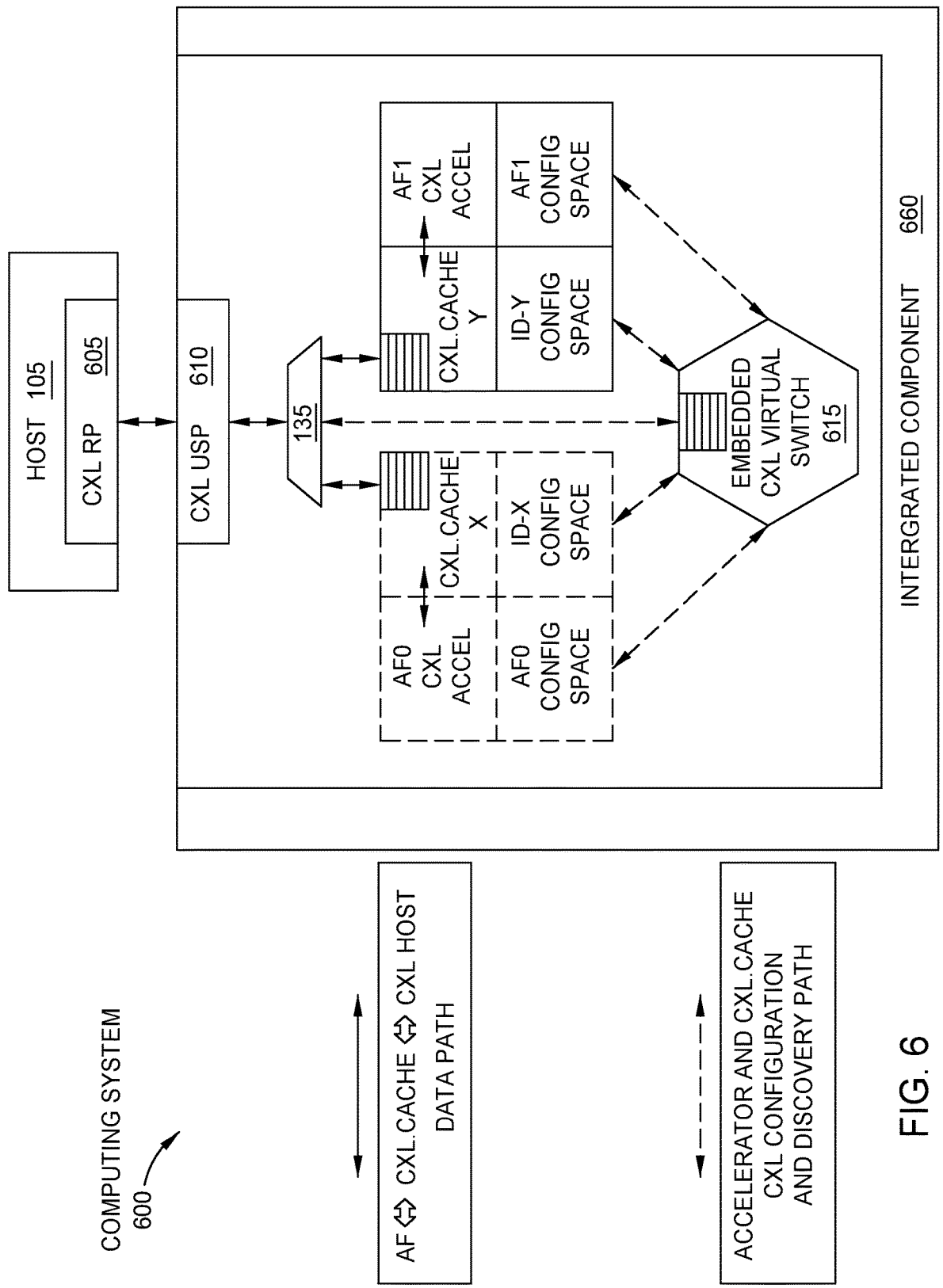
FIG. 6 illustrates a computing system where a new I/O function is added, according to examples.

In FIG. 6, a computing system 600 includes an integrated component 660 that is in the process of adding an I/O function. That is, an Accelerator Function 0 (AF0) and CXL.Cache X are being added in the integrated component 660 as shown by the dashed lines, while the AF1 and the CXL.Cache Y were already operating in the integrated component 660. In FIG. 6, it is assumed that the I/O functions—i.e., the AF0, AF1, CXL.Cache X and CXL.Cache Y are implemented in programmable logic while the AF0 Config Space, the ID-X Config Space, ID-Y Config Space, AF1 Config Space, and the embedded CXL disaggregated switch 615 are implemented in hardened circuitry. That is, by reconfiguring the programmable logic, the integrated component 660 can hot-swap (i.e., hot-add or hot-remove) the I/O functions: AF0, AF1, CXL.Cache X and CXL.Cache Y. However, in another embodiment, the I/O functions may be implemented in hardened logic. In that example, rather than adding or removing the I/O functions, the host 105 can hot-add or hot-remove the I/O functions by selectively activating or deactivating the I/O functions.

In another embodiment, the I/O functions—i.e., the AF0, AF1, CXL.Cache X and CXL.Cache Y as well as AF0 Config Space, the ID-X Config Space, ID-Y Config Space, AF1 Config Space are implemented in programmable logic such that, when the AF0 and CXL.Cache X are being added in the integrated component 660, a partially reconfigured programmable logic bitstream is added for AF0 and CXL.Cache X prior to the hot add event being initiated. In this embodiment, both the AF0 and CXL.Cache X can be hot plugged devices with functionality that is loaded prior as a programmable logic bitstream.

At block 510, the integrated component receives configuration information and binding for the new I/O function from the host. In one embodiment, the configuration information can include data for adding or activating the I/O function in the integrated component. In addition, the host transmits identification data that was assigned by the host to the new I/O function used as a binding for the I/O function which informs the pass through interface (and more specifically, the routing logic in the pass through interface) of the identification data. The routing logic in the pass through interface can then use this identification data when decoding received data packets to determine whether the packet should be routed to the new I/O function as described in method 300 above.

The block 510 includes the sub-block 515 where the integrated circuit receives a bitstream that includes structure for the new I/O function, data path binding, and configuration data binding. In one embodiment, the sub-block 515 is performed when the I/O function is implemented in programmable logic. For example, the integrated component 660 can use the bitstream to configure the programmable logic to include AF0 and the CXL.Cache X. The bitstream can also include structures for the registers in the AF0 and ID-X Config Spaces.

The data path binding can provide the routing information the pass through interface uses to route data packets directly to the new I/O function. The configuration data binding, on the other hand, includes the routing information the embedded switch and the pass through interface 135 use to route configuration data packets to the new I/O function using an indirect configuration data path. That is, the data path binding permits data to reach CXL Cache X directly from the pass through interface 135 while the configuration data binding permits data to reach the AF0 and ID-X Config Spaces via the embedded CXL switch 615.

At block 520, the integrated component activates the new I/O function and its bindings. That is, the integrated component configures the programmable logic to include the new I/O function or activates an I/O function in hardened circuitry that was previously deactivated using the information obtained at block 510.

At block 525, the integrated component transmits a virtual Hot-Plug Event to the host. In FIG. 6, the switch 615 generates a virtual Hot Plug Event and forwards the event to a Host Hot-Plug software driver executing on the host. Even though the new I/O function is direct attached to the upstream port, the virtual Hot Plug Event indicates to the host that a new I/O function (e.g., a new I/O device) is plugged into (or communicatively coupled to) a virtual downstream port that is connected to a virtual endpoint connection between the AF0 Config Space and the switch 615.

At block 530, the host discovers the new I/O function using configuration packets sent on the configuration data path. For example, the Host Hot-Plug Software Driver can respond to the virtual Hot-Plug Event and proceeds to discover the new endpoint I/O functions AF0 and CXL. Cache X using configuration read messages routed from the CSL root port (RP) 605 to the CXL upstream port (USP) 610 and through the pass through interface 135 to the switch 615. The switch 615 can then forward the configuration read messages to the virtual endpoint registers in the AF0 and ID-X Config Spaces.

At block 535, the host enumerates the new I/O function by programming corresponding registers. In one embodiment, the host 105 enumerates AF0 and CXL.Cache X by programming the AF0 and ID-X Config Spaces registers with CXL.Cache X's device ID and AF0's device ID. The host 105 is then ready to communicate data traffic to the new I/O function using the direct data path and the indirect configuration data path.

In one embodiment, once the blocks above are complete, at block 540 the host and integrated component route data packets to the new I/O function using the direct data path. At block 545, the host and integrated component route configuration packets to the new I/O function using the indirect configuration data path. In this manner, the host and integrated component can hot-add a new I/O device.

Figure 7:
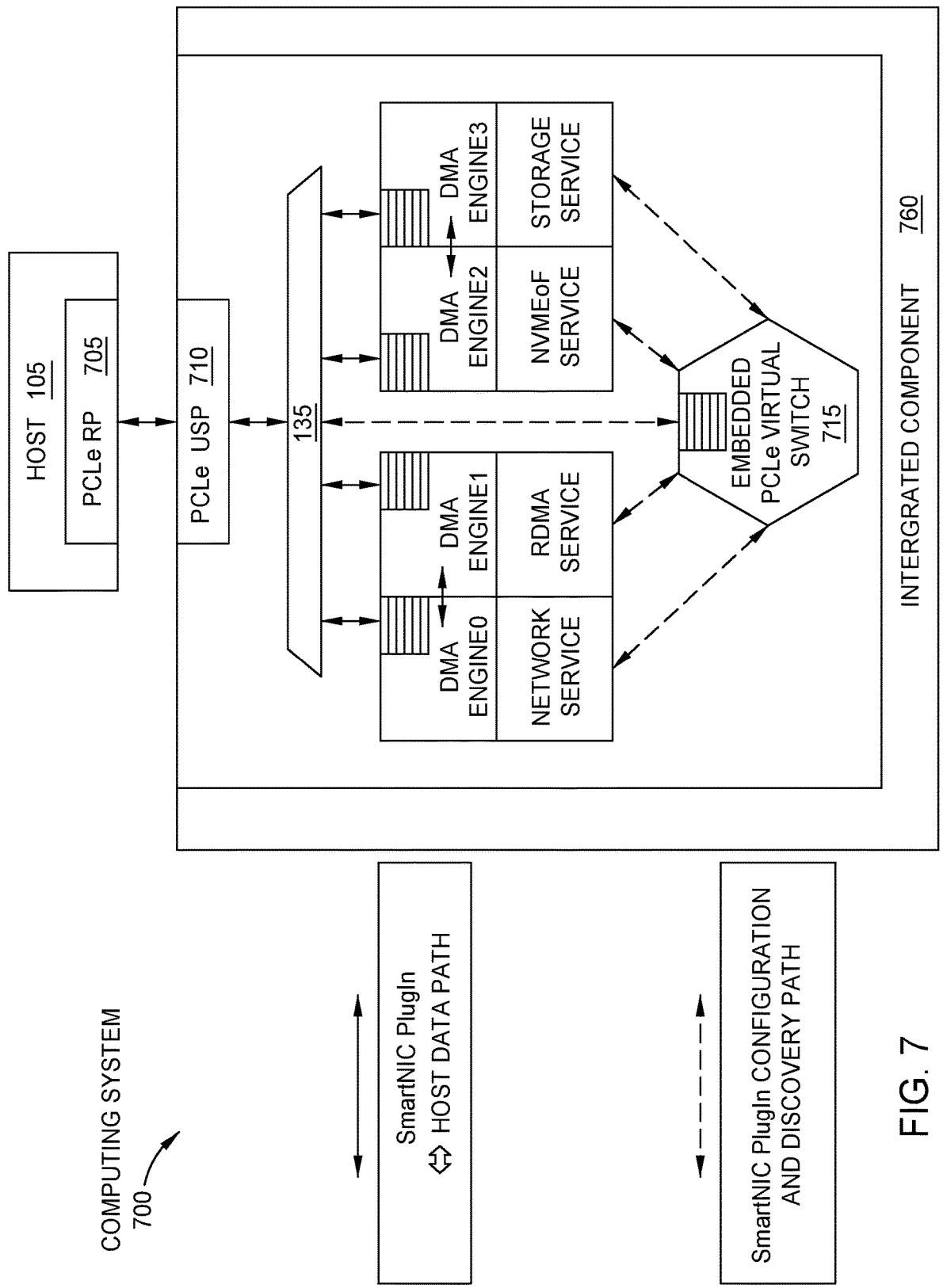
FIG. 7 illustrates a computing system with a host communicating with a converged network interface card, according to examples.

FIG. 7 illustrates a computing system 700 with a host 105 communicating with a converged NIC implemented using an integrated component 760, according to examples. Like the computing systems above, the computing system 700 includes the host 105 that is communicatively coupled to the integrated component 760 using a single physical connection between PCIe RP 705 and PCIe USP 710. Moreover, the integrated component 760 includes the pass through interface 135 for establishing the direct data paths between the host 105 and the I/O functions (i.e., DMA Engines0-3) and an indirect configuration data path that includes an embedded PCIe disaggregated switch 715.

FIG. 7 illustrates a PCIe component (e.g., the integrated component 760) connected to a PCIe connected Server (e.g., host 105). The integrated component 760 includes PCI DMA Engines0-3 that have low latency and high bandwidth interfaces to the host 105 and the corresponding services that are separate from their control and status structures or configuration spaces. In this example, each DMA engine0-3 corresponds to a different network function of the converged NIC (also referred to as a SmartNIC). For example, the DMA Engine0 corresponds to a network service, DMA Engine1 corresponds to a Remote Direct Memory Access (RDMA) service, DMA Engine2 corresponds to a Non-Volatile Memory Express Over Fiber (NVMEoF) service, and DMA engine3 corresponds to a storage service. High Bandwidth Device-to-Host DMA traffic for the Network, RDMA, NVMEoF, and Storage Services follow the direct data paths. Moreover, low latency Host-to-I/O Function Job Descriptors destined for those Network, RDMA, NVMEoF, and Storage Services can also follow the direct data paths. In contrast, the PCIe switch 715 can route Host-to-I/O Function low performance control path traffic for the DMA Engines0-3 as well as the corresponding Network, RDMA, NVMEoF, and Storage Configuration Spaces along indirect configuration data paths.

The DMA Engines0-3 can be implemented using programmable logic or hardened circuitry. Further, The DMA Engines0-3, and the corresponding services, can be added and removed (e.g., activated and deactivated) using the hot-adding and removal techniques discussed above.

Creating a direct data path separate from the indirect path that includes the embedded switch, the embodiments herein create a low-latency, high bandwidth data path interface to the host, including the ability to hot-plug add/remove endpoints (e.g., the I/O functions). With a direct data path, instead of arbitrating through a switch, superior performance is obtained for a number of embodiments such as low latency snoop responses for CXL.Cache and CCIX Cache embodiments, low latency and high bandwidth memory traffic for CXL.mem and CCIX Home Agent and Slave Agent embodiments, and low latency descriptor communication and high bandwidth DMA Reads/Writes for the PCIe Endpoint embodiments.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated component comprising:
   a first port configured to form a physical connection between a host and the integrated component;
   a plurality of I/O functions;
   an embedded switch; and
   a pass through interface configured to receive a packet from the host via the first port, identify a type of the packet, and route the packet one of: directly to a destination I/O function of the plurality of I/O functions so that the embedded switch is bypassed, or indirectly to the destination I/O function using the embedded switch based on the type of the packet,
   wherein the plurality of I/O functions operate independent of each other and perform different I/O functions, wherein each of the plurality of I/O functions has a first connection to the pass through interface that bypasses the embedded switch and a second connection to the embedded switch.

2. The integrated component of claim 1, wherein the type of the packet indicates whether the packet is a time sensitive data packet, wherein routing the packet directly to the destination I/O function bypasses the embedded switch.

3. The integrated component of claim 1, wherein the pass through interface comprises arbitration logic configured to receive indications that a first I/O function of the plurality of I/O functions and the embedded switch both have data ready to be transmitted to the host and arbitrate to determine which one of the first I/O function and the embedded switch is permitted to use the first port to transmit data to the host.

4. The integrated component of claim 1, wherein the pass through interface comprises routing logic for identifying the type of the packet and identifying a destination ID in the packet corresponding to the destination I/O function.

5. The integrated component of claim 1, wherein the host is configured to hot add a new I/O function into the integrated component while the plurality of I/O functions operate in parallel.

6. The integrated component of claim 5, wherein hot adding the new I/O function comprises configuring programmable logic in the integrated component to include the new I/O function.

7. The integrated component of claim 5, wherein hot adding the new I/O function comprises activating the new I/O function that was previously deactivated, wherein the new I/O function is implemented in hardened logic.

8. An apparatus, comprising:
a first port configured to form a physical connection with a second port on a host;
a plurality of I/O functions;
an embedded switch; and
a pass through interface configured to receive a packet from the host via the first port, identify a type of the packet, and route the packet one of: directly to a destination I/O function of the plurality of I/O functions so that the embedded switch is bypassed, or indirectly to the destination I/O function using the embedded switch based on the type of the packet,
wherein the plurality of I/O functions operate independent of each other and perform different I/O functions, wherein each of the plurality of I/O functions has a first connection to the pass through interface that bypasses the embedded switch and a second connection to the embedded switch.

9. The apparatus of claim 8, wherein each of the plurality of I/O functions is at least partially implemented in programmable logic.

10. The apparatus of claim 9, wherein the plurality of I/O functions are formed in a same integrated circuit.

11. The apparatus of claim 8, wherein each of the plurality of I/O functions is implemented using hardened logic.

12. The apparatus of claim 11, wherein the plurality of I/O functions are formed in a same integrated circuit.

13. The apparatus of claim 8, further comprising:
a substrate, wherein each of the plurality of I/O functions is implemented in a different integrated circuit, wherein the different integrated circuits and the embedded switch are mounted onto the substrate.

14. The apparatus of claim 8, wherein the apparatus is configured to hot add a new I/O function while the plurality of I/O functions operate in parallel.

15. The apparatus of claim 14, wherein hot adding the new I/O function comprises configuring programmable logic in the apparatus to include the new I/O function.

16. The apparatus of claim 14, wherein hot adding the new I/O function comprises activating the new I/O function that was previously deactivated, wherein the new I/O function is implemented in hardened logic in the apparatus.

17. A method, comprising:
receiving a first packet from a host at a pass through interface in an integrated component, wherein the integrated component comprises a plurality of I/O functions and an embedded switch communicatively coupled to the pass through interface;
determining that the first packet is a data packet, wherein a first I/O function of the plurality of I/O functions is a destination of the data packet;
routing the data packet directly from the pass through interface to the first VO function using a direct data path that bypasses the embedded switch;
receiving a second packet from the host at the pass through interface;
determining that the second packet is a configuration packet, wherein the first I/O function is the destination of the configuration packet;
routing the data packet from the pass through interface to the first I/O function via the embedded switch; and
operating the plurality of I/O functions independent of each other to perform different I/O functions, wherein each of the plurality of I/O functions has a first connection to the pass through interface that bypasses the embedded switch and a second connection to the embedded switch.

18. The method of claim 17, wherein routing the data packet from the pass through interface to the first I/O function via the embedded switch further comprises:
routing the configuration packet from the pass through interface to the embedded switch;
determining, at the embedded switch, that the first I/O function is the destination of the configuration packet; and
forwarding the configuration packet from the embedded switch to the first I/O function,
wherein the method further comprises:
receiving a third packet from the host at the pass through interface;
determining that the third packet is a different configuration packet;
routing the different configuration packet to the embedded switch; and
determining, at the embedded switch, that the embedded switch is the destination of the different configuration packet.

19. The method of claim 18, further comprising:
determining, at the pass through interface, that the embedded switch and at least two of the plurality of I/O functions have packets ready to be transmitted to the host; and
arbitrate between the embedded switch and the at least two of the plurality of I/O functions based on a quality of service (QoS) policy to determine which gets to use a shared port in the integrated component to transmit data to the host.

* * * * *

UNITED STATES PATENT AND TRADEMARK OFFICE
CERTIFICATE OF CORRECTION

PATENT NO. : 11,386,031 B2
APPLICATION NO. : 16/894446
DATED : July 12, 2022
INVENTOR(S) : Millind Mittal and Jaideep Dastidar It is certified that error appears in the above-identified patent and that said Letters Patent is hereby corrected as shown below:

In the Claims

Column 16, Line 16 (Approx.), In Claim 17, delete "VO" and insert -- I/O --, therefor.

Signed and Sealed this
Seventh Day of March, 2023

Katherine Kelly Vidal
*Director of the United States Patent and Trademark Office*